Patented June 12, 1928.

1,673,154

UNITED STATES PATENT OFFICE.

ALFRED MILLER, OF BUFFALO, NEW YORK, ASSIGNOR TO TOWER MANUFACTURING CO., INC., A CORPORATION OF NEW YORK.

PROCESS OF PURIFYING PARA-NITRANILINE.

No Drawing. Application filed July 14, 1925, Serial No. 43,618. Renewed October 25, 1927.

This invention relates to a new process of purifying or treating nitraniline, specifically para-nitraniline. In the manufacture of para-nitraniline from para-nitro-chlorbenzene with ammonia under pressure, certain by-products are formed, as described by Ullman, Enzyklopadie der technischen Chemie, vol. I, page 440, and these have the effect of causing a flocculent precipitate to form when the nitraniline is diazotized.

It is an object of this invention to prevent the formation of such precipitate and thus to purify the nitraniline by a suitable treatment with a reducing agent or its equivalent. In accomplishing this result I treat the nitraniline with either a neutral, acid or alkaline reducing agent in suitable proportions at an elevated temperature, as more fully described in the following examples.

One hundred and sixty parts of crude para-nitraniline are suspended in 2800 parts of water. 6½ to 8 parts of sodium sulphide crystals are dissolved in 200 parts of water and filtered free from any sediment which may be present. The solution of sodium sulphide is added to the suspension of para-nitraniline and the charge is heated up to 95° to 100° C. with constant agitation. It is then cooled to 40° to 45° C., filtered, and washed with water. The resulting para-nitraniline gives a clear diazo solution.

As a second example, I suspend 160 parts of crude para-nitraniline in 2500 parts of water, and then add a solution of ammonium sulphide containing 2 to 2½ parts of 100% ammonium sulphide. The liquid is heated to 90° to 100° C., thereafter cooled to 30° to 35° C., filtered, and washed well.

As another example, I take 160 parts of crude para-nitraniline, suspend it in 2500 parts of water and 2 parts of stannous chloride, and add 2 parts of ammonium chloride. The temperature is raised to 80° to 90° C. while the solution is agitated and it is thereafter again cooled to 30° to 35° C., filtered and washed.

A still further example consists in taking 160 parts of crude para-nitraniline suspended in 3000 parts of water, and adding 2 to 3 parts of stannous chloride and 2 to 3 parts of commercial muriatic acid of 20° Bé. density. The solution is heated to 80° to 90° C., cooled to 30° to 35° C., filtered and washed. The para-nitraniline obtained gives a clear diazo solution free from any flocculent precipitate.

In these examples I have named mild reducing agents which reduce the nitro bodies or other impurities present but which do not affect the nitraniline molecule itself,—that is to say, there is no reduction of the $NO_2$ group attached to the benzene nucleus. The quantity of reducing agent employed is proportioned to the amount of impurity present. By "mild" reducing agent in the claims I mean to include the above described dilute reducing agents and their equivalents, which have the herein described effect. The process can be applied to nitraniline from whatsoever source derived and it may also be applied at any suitable point in the manufacture of nitraniline.

As various embodiments of the invention may be made without departing from the principle thereof it is to be understood that I do not limit myself to the foregoing embodiments except as defined in the following claims.

I claim:

1. In the manufacture of nitraniline from nitro-chlor-benzol with ammonia wherein certain by-products are formed which cause a flocculent precipitate upon diazotization, the process characterized by reducing said by-products by means of a mild reducing agent.

2. In the manufacture of nitraniline from nitro-chlor-benzol with ammonia wherein certain by-products are formed which causes a flocculent precipitate upon diazotization, the process characterized by reducing said by-products by means of stannous chloride in dilute solution.

3. In the manufacture of nitraniline from nitro-chlor-benzol with ammonia wherein certain by-products are formed which cause a flocculent precipitate upon diazotization, the process characterized by reducing said by-products with stannous chloride in dilute aqueous solution, heating to a temperature below boiling and thereafter filtering off the solution from the nitraniline.

In testimony that I claim the foregoing, I have hereunto set my hand this 10th day of July, 1925.

ALFRED MILLER.